United States Patent [19]

Muller

[11] 3,900,222

[45] Aug. 19, 1975

[54] COMPARTMENTED RESILIENT BUMPER ASSEMBLY

[75] Inventor: George H. Muller, Ann Arbor, Mich.

[73] Assignee: Ford Motor Company, Dearborn, Mich.

[22] Filed: Nov. 9, 1973

[21] Appl. No.: 414,598

Related U.S. Application Data

[63] Continuation of Ser. No. 194,934, Dec. 2, 1971.

[52] U.S. Cl. ............................... 293/71 P; 267/116
[51] Int. Cl.² .......................................... B60R 19/10
[58] Field of Search ........ 293/1, 60, 70, 71 P, 71 R, 293/98; 267/116, 139, 140; 114/219

[56] References Cited
UNITED STATES PATENTS

| | | | |
|---|---|---|---|
| 2,028,060 | 1/1936 | Gilbert | 293/71 P |
| 3,810,668 | 5/1974 | Kornhauser | 293/71 P |

FOREIGN PATENTS OR APPLICATIONS

| | | | |
|---|---|---|---|
| 1,035,216 | 8/1953 | France | 293/71 P |

*Primary Examiner*—Evon C. Blunk
*Assistant Examiner*—Robert Saifer
*Attorney, Agent, or Firm*—Roger E. Erickson; Keith L. Zerschling

[57] ABSTRACT

A pneumatic resiliently deformable bumper assembly suitable for use with an automotive vehicle. The assembly includes a rigid backing member secured to the body of the vehicle and a resilient shell member clamped to the backing member. The resilient shell member has a generally U-shaped cross section and with the backing member forms a hollow elongate enclosure. The enclosure is divided longitudinally by a plurality of deformable partitions into a series of compartments. Passages between the compartments permit a small regulated air flow between compartments yet prevent substantial air flow and collapse when a single compartment is instantaneously compressed as by a sudden impact. An inner tube may be used within the enclosure to carry the inflation pressure.

3 Claims, 3 Drawing Figures

COMPARTMENTED RESILIENT BUMPER ASSEMBLY

This is a continuation of application Ser. No. 194,934, filed Dec. 2, 1971.

BACKGROUND AND SUMMARY OF THE INVENTION

Most resilient pneumatic bumpers known in the art include elongate pneumatic enclosures several times longer than wide. This invention provides a means to increase the effectiveness of such a bumper when an impact is confined to a small portion of the total length of the bumper. An example is when the bumper engages a vertical pole. This invention provides a resilient pneumatic bumper in which the enclosure is divided by a series of partitions into a plurality of longitudinally disposed compartments. Interconnecting the compartments are passages which permit a controlled or throttled flow of air between the compartments in the event of localized impact. The passage restricts the rapid escape of air from the impacted compartment and prevents the resilient outer shell from bottoming against its backing or support member. However, controlled air flow from the impact compartment is permitted through the passages between compartments to prevent excessive pressure buildup. The passages serve also to dissipate a portion of the impact energy. The passages further serve to equalize the compartment pressures during inflation and normal unimpacted usage.

The invention provides partitions extending transversely to the general extent of the bumper which cause general stiffening and an increased impact absorption ability. The invention also provides a pneumatic bumper having a plurality of longitudinally disposed compartments in which the connecting passages between compartments are completely contained within the pneumatic enclosure. The invention further provides a construction in which a one-piece inner tube member may be utilized. Still further, the invention provides a resilient pneumatic bumper construction which is economical to produce, reliable in operation and adaptable for use with present day automobiles.

A resiliently deformable pneumatic bumper assembly constructed in accordance with this invention includes a rigid elongate backing member secured to a vehicle body and a resiliently deformable elongate outer shell clamped or otherwise secured to the backing member. The outer shell and the backing member form a pneumatic enclosure. A plurality of partitions extend from the outer shell toward the backing member dividing the enclosure into a plurality of consecutive compartments. Passage means interconnect the compartments and permit restricted communication between adjacent compartments. However, in the event of sudden impact to one of the compartments, substantial air flow between adjacent compartments is not possible and bottoming of the resilient outer shell against the backing member is prevented.

DETAILED DESCRIPTION OF THE PREFERRED EMBODIMENT

Figure 1:
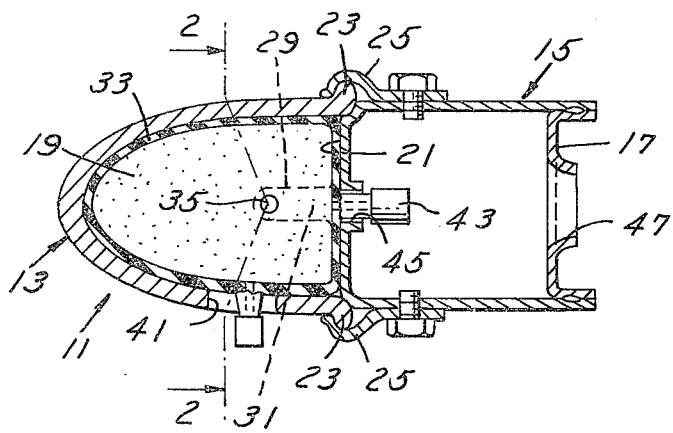
FIG. 1 is a transverse cross sectional view of an automotive vehicle bumper embodying the invention.
Figure 2:
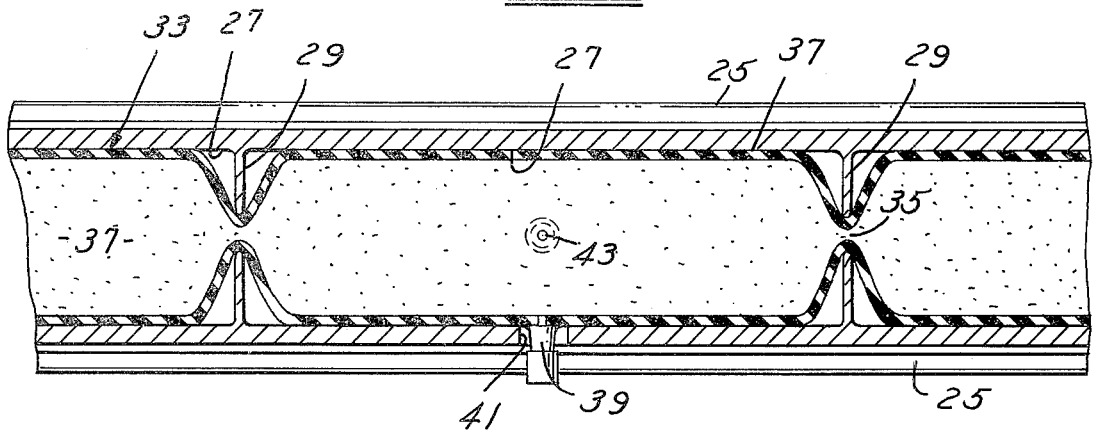
FIG. 2 is a cross sectional view taken along line 2—2 of FIG. 1.
Figure 3:
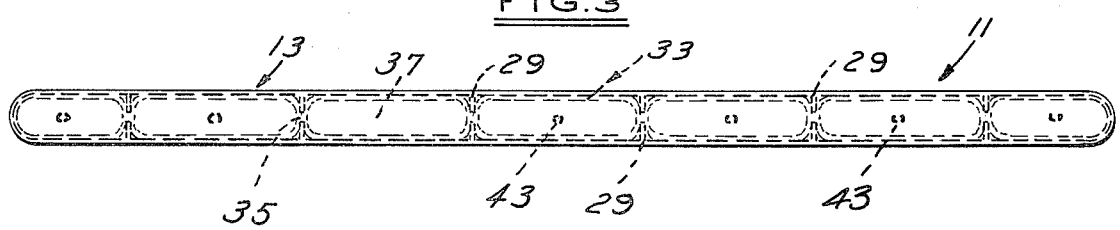
FIG. 3 is an elevational view showing the entire bumper assembly width as viewed from the front of the vehicle.

A pneumatic bumper assembly is illustrated generally by numeral 11 and includes a resilient outer shell 13 mounted to a backing member 15. The backing member is secured by welding or other suitable means to one or more body or frame members 17. The resilient outer shell 13 has a generally U-shaped or parabolic cross section and forms an elongate enclosure 19 with the front portion 21 of the backing member 15. The edges of the outer shell terminate with a pair of tire-type beads 23 which are clamped against the backing member 15 by clamps 25. The enclosure defined by the outer shell and the front portion of the backing member is divided into a series of compartments 27 by a plurality of partitions 29 which are positioned generally perpendicular to the general extent of the bumper assembly and extend from the outer shell toward the backing member portion 21. Adjacent compartments are interconnected by passage means 31 provided between the partition and the portion 21. The partitions 29 may be integrally formed with the outer shell 13.

An inflatable inner tube 33 is received within enclosure 19 and has an elongate shape similar to the bumper enclosure. It includes a series of longitudinally spaced constrictions 35 corresponding to the partitions 29 and passages 31 of the outer shell 13. The constrictions divide the inner tube into a number of segments 37, each of which is received within one of the compartments 27. The constrictions are approximately one-quarter inch in diameter as compared with three-to-four inch normal diameters of the segments. A typical air pressure check valve 39 is positioned on one of the segments 37 through which compressed air may be fed into all of the tube segments. An opening 41 may be provided in the bottom of the outer shell 13 through which the check valve may protrude for accessibility.

A pressure relief valve 43, shown in FIG. 1, extends through an opening 45 in the front face 21 of the backing member 15. Such valves may be provided to limit or reduce magnitudes within the compartments and segments under impact and to provide for escape of compressed air to the atmosphere and dissipation of impact energy. The volume between the backing member front face and the frame member is opened to the atmosphere by opening 47. Each segment of the inner tube may be provided with a pressure relief valve. Several pressure relief valves known in the art would be acceptable.

Functionally, the partitions 29 stiffen or decrease deformation of the outer shell for a given impact. The individual compartments 27 and segments 37 provide localized pneumatic resistance in the event of impact with a relatively narrow object. The constrictions 35 between the segments of the inner tube when confined within passages 29 remain sufficiently small so as to prevent escape of substantial quantities of air from the individual segments and compartments upon a concentrated impact. Yet the constricted passages permit a regulated discharge of compressed air which dissipates an amount of impact energy. The constricted passages also permit the segments and compartments to equalize their pressures during inflation and under normal unimpacted conditions. It further may be seen that the interconnecting passages are all contained within the bumper enclosure and are formed from the resiliently deformable bumper components.

Modifications and alterations may occur to those skilled in the art which are included within the scope of the following claims.

I claim:
1. A resiliently deformable bumper assembly for a vehicle and the like comprising
   a rigid elongate backing member secured to the vehicle body,
   a resiliently deformable elongate outer shell,
   means securing said outer shell to the backing member,
   said outer shell and said backing member forming a substantially sealed elongate enclosure,
   a plurality of partitions extending generally transversely to said outer shell and dividing said enclosure into a plurality of consecutive compartments, each said partition serving as a wall for a pair of adjacent compartments,
   passage means interconnecting said compartments and permitting passage of air and the like between adjacent compartments under unimpacted conditions,
   said partitions and passage means comprising throttling means restricting substantial air flow between adjacent compartments and thereby preventing immediate collapse of an individual compartment upon a sudden impact confined to that compartment,
   an elongate inflatable inner tube member received within said enclosure,
   said tube member having a plurality of longitudinally spaced constrictions dividing said tube member into a plurality of sausage-like segments,
   each of said compartments containing one of said segments conforming generally to the interiors of said compartments,
   said partitions positioned about and engaging said constrictions.

2. A resiliently deforming bumper assembly for a vehicle and the like comprising
   a rigid elongate backing member secured to the vehicle,
   an elongate resilient shell engageable with the backing plate,
   clamping means securing said shell to said backing member,
   said shell and said backing member forming a generally hollow enclosure,
   said shell including a plurality of integrally formed partitions extending from the interior of said shell toward said backing member and dividing the enclosure into a plurality of longitudinally disposed compartments, each of said partitions having the major portion of its periphery joined to said outer shell,
   passage means interconnecting said compartments permitting the flow of air and the like under unimpacted conditions and comprising throttling means substantially limiting flow to adjacent compartments upon sudden impact and compression of one or more of the compartments,
   said partitions and passage means preventing an immediate collapse of a bumper compartment upon impact with an object engaging only a small portion of the bumper shell,
   an elongate inflatable inner tube member received within said enclosure,
   said tube member having a plurality of longitudinally spaced constrictions dividing said tube member into a plurality of sausage-like segments,
   said constrictions being cooperatively associated with said partitions and passage means, said partition being engageable with said constrictions.

3. A resiliently deformable bumper assembly according to claim 2,
   said passage means comprising notches formed in said partitions and opening against said backing member, said constrictions being received within said notches.

* * * * *